Nov. 18, 1969   D. A. LESTER   3,479,112
FILM CARTRIDGE FOR CONTINUOUS SHOWING OF MOTION PICTURE FILM
Filed April 11, 1967   3 Sheets-Sheet 1
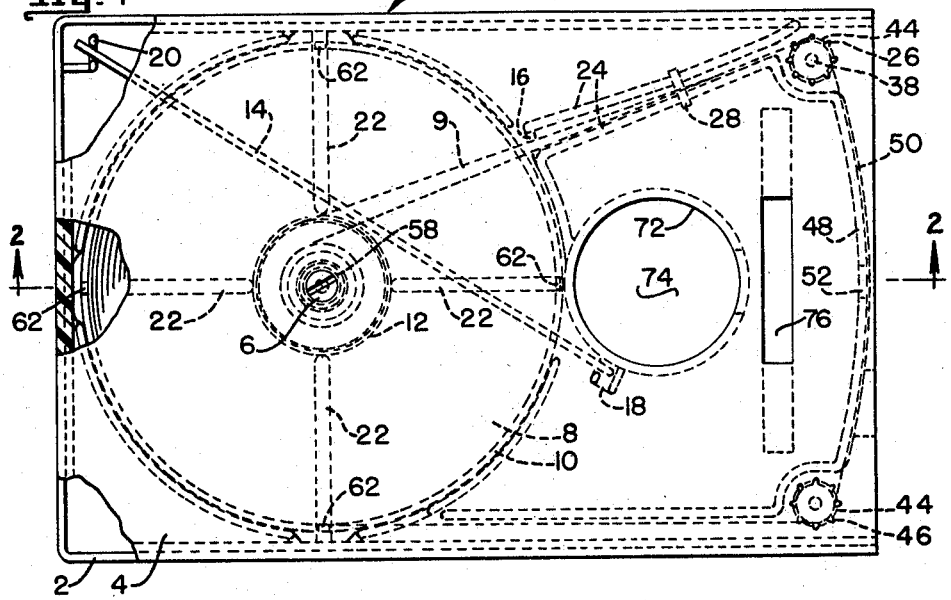
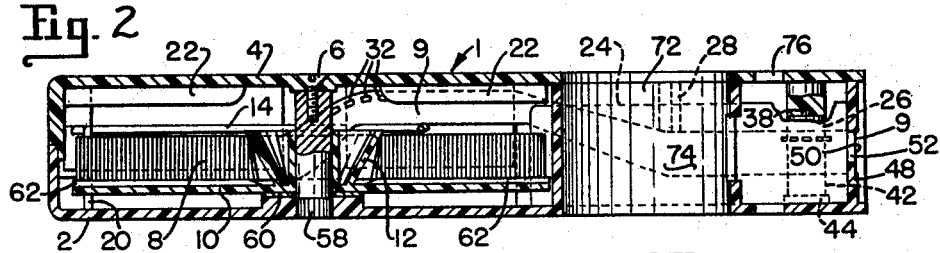
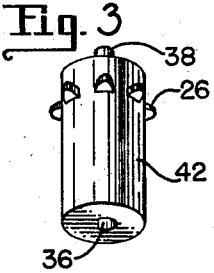
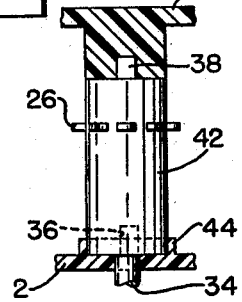
DAN A. LESTER
*INVENTOR.*
BY
*Wayland D Keith*
HIS AGENT Nov. 18, 1969   D. A. LESTER   3,479,112
FILM CARTRIDGE FOR CONTINUOUS SHOWING OF MOTION PICTURE FILM
Filed April 11, 1967   3 Sheets-Sheet 2

DAN A. LESTER
*INVENTOR.*

BY

*Wayland D. Keith*
HIS AGENT

Nov. 18, 1969      D. A. LESTER      3,479,112
FILM CARTRIDGE FOR CONTINUOUS SHOWING OF MOTION PICTURE FILM
Filed April 11, 1967      3 Sheets-Sheet 3
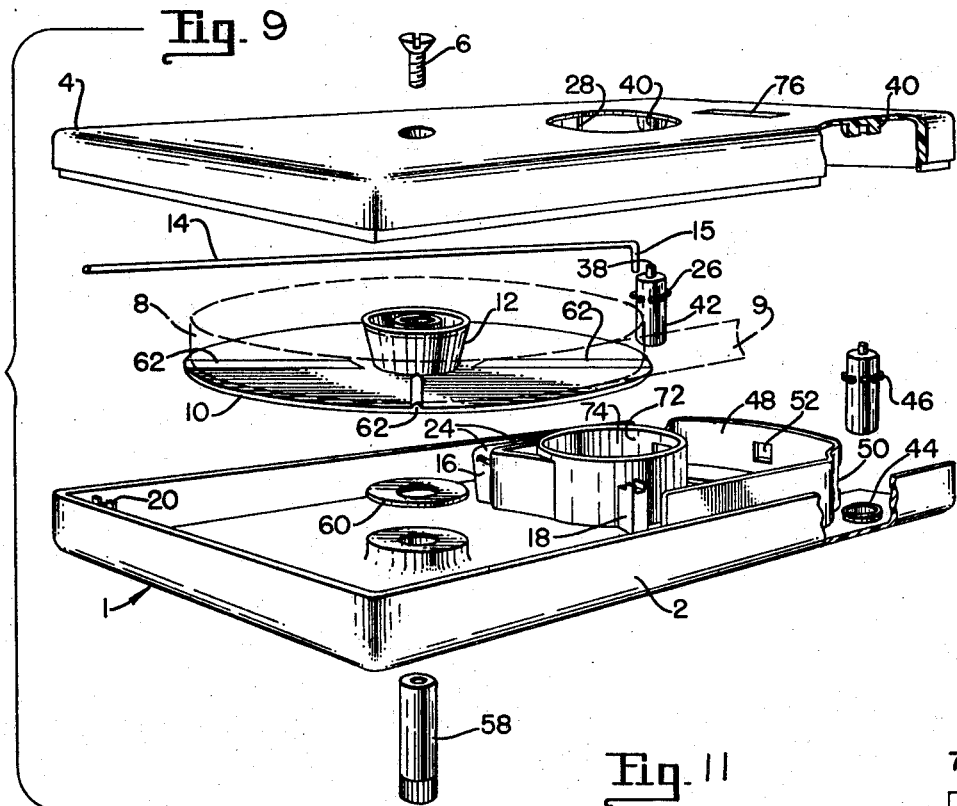
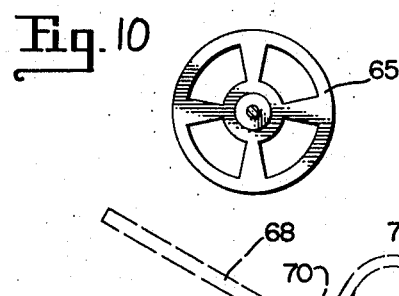
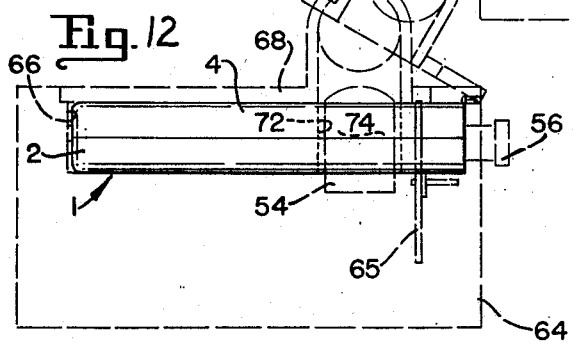
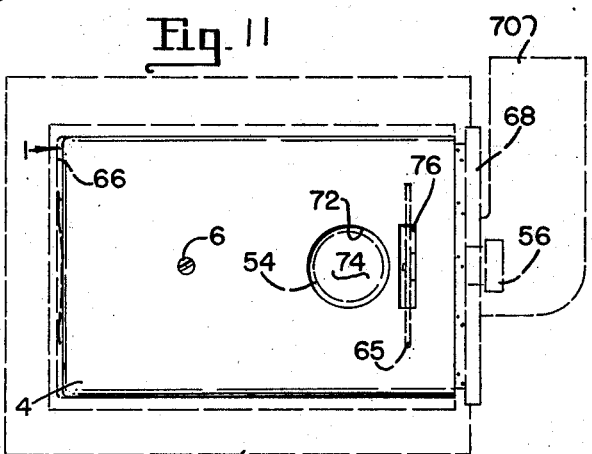
DAN A. LESTER
*INVENTOR.*
BY
*Wayland D Keith*
HIS AGENT

United States Patent Office

3,479,112
Patented Nov. 18, 1969

---

3,479,112
FILM CARTRIDGE FOR CONTINUOUS SHOWING OF MOTION PICTURE FILM
Dan A. Lester, 522 Fairway Blvd.,
Wichita Falls, Tex. 76310
Filed Apr. 11, 1967, Ser. No. 630,020
Int. Cl. G03b 23/02
U.S. Cl. 352—78        6 Claims

ABSTRACT OF THE DISCLOSURE

A film cartridge for showing motion picture film continuously which is so constructed that the film cartridge may be dropped into a complementary receptacle in a motion picture machine so that a tubular member in the cartridge will be received onto a motion picture projection lamp so that an aperture formed in the tubular member will be in alignment with a filament in the motion picture projector lamp so as to permit light to pass therethrough, and through a picture frame in the film so as to project a motion picture image through a lens system. Provisions are made to drive an endless film in the motion picture cartridge by sprockets therein which sprockets are engaged with the film at all times. The sprockets each have a non-circular hole formed therein to complementary register with drive shafts of a motion picture machine so as to bring a frame of the film into proper register with the aperture when the cartridge is dropped into the motion picture machine.

---

This invention relates to improvements in film cartridges and more particularly to a film cartridge for showing motion picture film continuously.

Various mechanisms for showing motion picture film continuously have been proposed heretofore however these, for the most part, required that the film be threaded on to the motion picture machine each time it was run, with the film traveling a circuitous path on a somewhat conventional motion picture machine.

The present film cartridge for motion picture films enables the entire film cartridge to be dropped into place in a special motion picture machine and the entire film shown, then the film may be re-shown until it is desirable to remove the film cartridge and insert a new film cartridge into the motion picture machine, which may be done without any threading or the connecting of any gears, or the like, other than dropping the film into a film receiving socket, which automatically connects the driving mechanism of the cartridge in driven relation, and with the film being directed through the motion picture machine so that the frames will be sequentially projected in the proper order by a mechanism well known in the art of motion picture projection apparatus. The movement of the film is usually effected by an intermittent claw movement, as by the operation of a Scotch-yoke and cam arrangement or by a Geneva gear arrangement which advances the film in timed sequence, together with other mechanisms to give a clear projection picture, as is well known in the art of motion picture projection machines.

The present motion picture film cartridge is so designed that it may show 8, 16, or 35 millimeter film by increasing or decreasing the size of the cartridge housing and component parts in accordance with the size film to be used.

An object of the invention is to provide a cartridge for showing motion picture film continuously, which cartridge has the film prethreaded thereinto, which film is connected in driving relation with drive sprockets so that the film may be shown instantly and continuously, when placed into a motion picture projector.

Another object of the invention is to provide a film cartridge with prethreaded, endless film therein, whereby the portion of the film being projected lies substantially in the same projection plane as the film on the spool.

Still a further object of the invention is to provide a film cartridge, with an endless film thereon, which cartridge has drive sprockets journaled therein to drive the film in accordance with the proper timed sequence to properly project motion pictures from the film being passed therethrough.

Still another object of the invention is to provide a cartridge for motion picture film which has a spool of endless film thereon, whereby the film being shown is removed from the inside of the spool and wound on to the outside of the spool continuously.

And still a further object of the invention is to provide a film cartridge having a lamp receiving hole therethrough so the film cartridge may be fitted thereover and in proper relation to a rotating shutter to enable the frames of the film to be moved into and out of projection position without visible interruption.

Still another object of the invention is to provide a film cartridge for continuously showing film, which is simple in construction, easy to install film thereinto, easy to operate, easy to install and remove from a motion picture machine, and which is low in cost of manufacture.

A preferred embodiment of the invention is shown in the accompanying drawings in which like reference characters designate like parts in the several views thereof, in which:

FIG. 1 is a top plan view of the film cartridge, with parts broken away and shown in section, and with parts shown in dotted outline to bring out the details of construction;

FIG. 2 is a sectional view taken on line 2—2 of FIG. 1, looking in the direction indicated by the arrows;

FIG. 3 is an enlarged perspective view of a drive sprocket shown apart from the film cartridge;

FIG. 4 is an enlarged, fragmentary view, partly in section, of a portion of the film cartridge, showing a drive sprocket in elevation;

FIG. 9 is an exploded, perspective view of the component parts of the film cartridge, the position of the roll of motion picture film on the winding spool being shown in dashed outline;

FIG. 10 is an elevational view of a rotary shutter;

FIG. 11 is a top plan view of a motion picture projection machine, on a reduced scale, shown in full outline, and showing a film cartridge therein in full outline to show the relative position of the film cartridge to the motion picture projection machine, and showing the cover in raised position in full outline; and FIG. 12 is an elevational view of the motion picture machine in dashed outline, on the same scale as FIG. 11, the motion picture film projection cartridge being shown in full outline, the cover of the motion picture machine being shown in two positions, in dashed outline.

Figure 7:
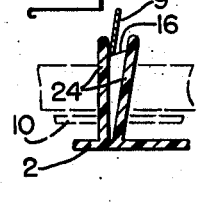
FIG. 7 is a fragmentary elevational view taken on line 7—7 of FIG. 5, looking in the direction indicated by the arrows, and showing the film being unwound from the spool, which film is elevated above the spool.
Figure 8:
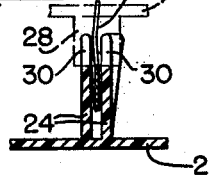
FIG. 8 is a sectional view taken on line 8—8 of FIG. 5, looking in the direction indicated by the arrows.

With more detailed reference to the drawing, the numeral 1 designates generally a film cartridge having separable units to form a housing, which housing comprises a lower unit 2 and an upper unit 4, which, when fitted together in secure relation by a screw 6, serves to encase a roll of film 8, which is mounted on a rotatable spool 10, the ends of which film are joined in end to end relation, to form a film for continuous showing. The lower unit 2 of the cartridge housing has a tubular casing 72 extending upward from an opening therein to register with an opening 73 formed in the upper unit 4 of the cartridge housing. This tubular casing 72 has an aperture 74 formed in a side thereof to enable light from a lamp 54 to be projected therethrough, as will be more fully brought out hereinafter. The tubular casing 72 forms a conduit through cartridge housing 1 and when a lamp 54 is received therein, an annular air passage is formed between the lamp and the inner wall of the tubular casing to register with air conduit 70, for directing air therethrough for cooling of the lamp 54. The film will be unwound from the center of the spool and will be passed upward, at an angle, from angulated spool core 12, thence over a support bar 14 so the lower edge of the film 9 will pass in abridging relation across the upper surface of the roll of film 8, with a support rib 16 holding the film in supported relation, as indicated in FIGS. 2, 5, and 7.

Figure 5:
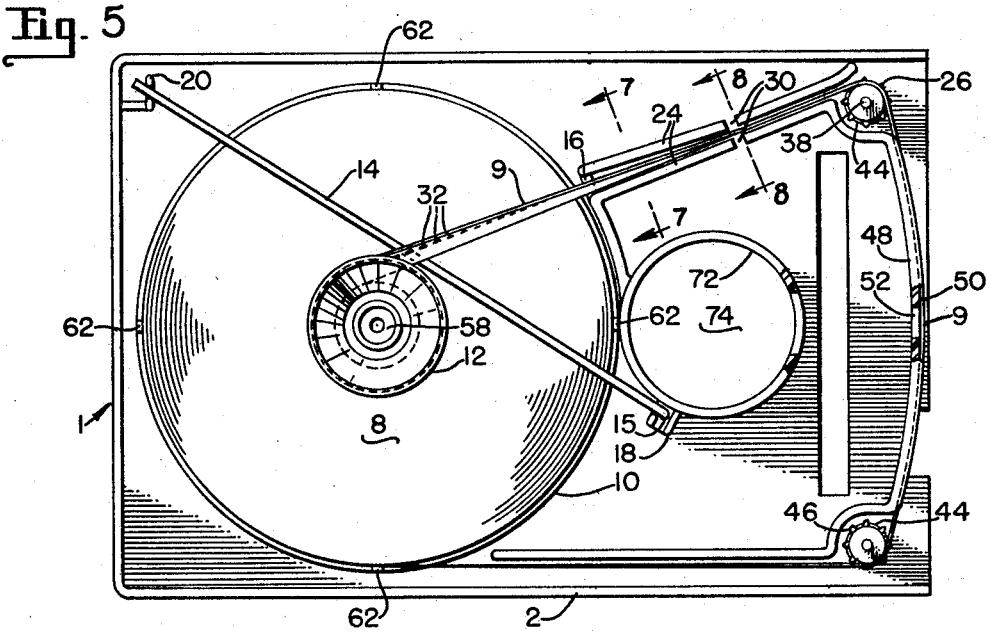
FIG. 5 is a top plan view of the film cartridge showing the film therein, the top cover thereof being removed, and particularly showing the transition movement of the film from the center of the spool onto the drive sprockets and back onto the outer diameter of the roll of film.
Figure 6:
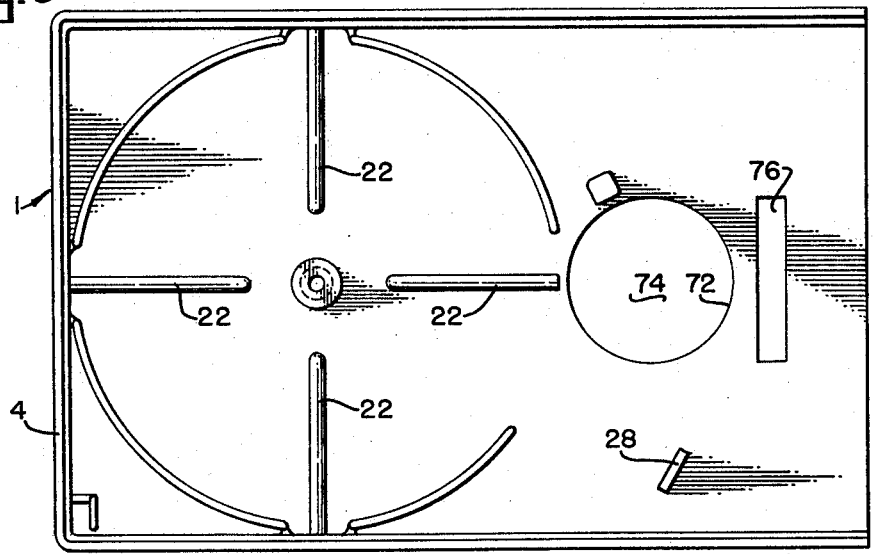
FIG. 6 is an inside view of the cover portion of the film cartridge shown apart therefrom.

The support bar 14 has a down-turned projection 15 on one end thereof to complementally fit within a hole which is formed in outwardly extending lug 18 on the lower unit 2 of the housing on one side of the roll of film 8, and into a recessed lug 20 on the lower unit 2 of the housing, on the side thereof opposite the roll of film 8, as will best be seen in FIGS. 1, 5 and 9.

The top portion 4 of the film housing has guide ribs 22 formed interiorly thereon to complementally receive the upper edge of the film so as to route the film in guided relation between upstanding ribs 24 in the lower unit 2 of the housing. The upstanding ribs 24 extend to a point adjacent a drive sprocket 26, however, since the film 9 is elevated above the roll of film 8 as it comes off the spool 10, it is necessary for the film to be moved to a lower elevation, as will best be seen in dotted outline in FIG. 2, whereupon a projection 28, which extends downward from the upper housing unit 4 between slots 30 in ribs 24, depresses the film into substantial alignment with drive sprocket 26 so that perforations 32, which are formed in the edge of film 9, will come into aligned register with the drive sprocket 26, which sprocket 26 is driven by the mechanism of the motion picture machine. The motion picture machine 64 has an upwardly extending shaft 34, which registers with a non-circular hole 36 in the lower end of the drive sprocket 26. The upper end of the drive sprocket 26 has a pintle 38 thereon, which pintle 38 complementally engages within a hole in the projection 40 on the upper portion of the housing unit 4. The lower end of the sprocket 26, has a smooth cylindrical surface 42 for guiding the film thereover. The cylindrical surface or spool-like member 42 is seated within an annular rim 44, which rim serves as a bearing and stabilizer therefor, so as to enable shaft 34 to drive the spool-like member 42 and the sprocket 26.

A second drive sprocket 46 is provided on the opposite side of the cartridge 1, so as to maintain the film 9 in taut relation over an arcuate guide 48, in which guide a groove 50 is formed, to guide the film 9 across the aperture 52 in the arcuate guide 48, to enable the light from lamp 54 to shine through the film 9 and through the lens system 56 to project the picture onto a screen or the like.

The film which passes over the drive sprocket 46 is guided onto the outer periphery of the roll of film 8 in undistorted, winding relation; however, as the film winds onto the outside of the roll of film 8, the spool 10 turns on an axial member 58, which has a thrust bearing 60 therearound, and beneath the spool 10, so that the spool will rotate freely. The spool 10 has radial ribs 62 thereon, so as to minimize the friction of the film passing onto the outer diameter of the roll of film and moving transversely thereacross and off of the inner diameter of the roll of film on the angulated spool core 12, which spool core 12 is preferably at an angle between 45 and 60 degrees with respect to the horizontal, so as to prevent the film from kinking or otherwise becoming entangled.

The motion picture machine, designated generally at 64, has the usual film moving mechanism therein to move the film frame by frame, as is well understood in the art of motion picture projection, and a rotary shutter 65, which prevents movement of the frames of the film from one frame to another being visible. The motion picture projection machine 64 has a recess 66 therein, preferably in the top thereof, in which recess 66 the film cartridge, designated generally at 1, is dropped, so as to be in complementary relation with the holes 36, which may be of non-circular shape, such as D-shaped, or the like, will register with a complementary shaft 34 in each side of the motion picture projection machine, so it will automatically cause a frame of the film to register with the aperture 52 to properly project the film in timed relation, whereupon, a closure member 68 is closed, which member 68 preferably has an air conduit 70 leading therefrom, so that air may be forced upward through the substantially closed tubular casing 72, which forms an air conduit, past lamp 54, to maintain the lamp cool at all times, thereby to prevent heat from being readily transferred from the lamp to the wall of the tubular casing 72 which has the aperture 74 formed therein within the film cartridge housing 1.

A slot 76 is formed in the cartridge 1 intermediate the lamp 54 and the lens system 56, so that the rotary shutter 65 can rotate freely therein to allow the proper sequencing of the frames of the film.

Having thus clearly shown and described the invention, what is claimed as new and desired to be secured by Letters Patent is:

1. A cartridge for continuous showing of a motion picture film, which cartridge comprises;
   (a) a housing,
      (1) said housing including two longitudinally separable portions,
      (2) said longitudinally separable portions having lamp receiving openings formed therein,
   (b) an axial member mounted transversely of said housing,
   (c) a rotatable spool journaled on said axial member for rotation about the axis thereof,
   (d) an angulated core on said rotatable spool, which core diverges outwardly from the base of said spool,
      (1) said rotatable spool adapted to have endless, apertured motion picture film coiled around the angulated core thereof to form a roll or film, which film passes off said angulated core at substantially the angle of said core and across the face of said film to a point beyond the exterior thereof,
   (e) a film support bar extending across the face of said roll of film and between said roll of film and said portion of said motion picture film coming off of the angulated core of said spool,
   (f) a pair of spaced apart sprockets in said housing remote from said spool to complementally receive motion picture film thereon,
      (1) at least one of said sprockets being adapted to be connected in driving relation with a power drive shaft,
   (g) upstanding ribs on a portion of said housing, which ribs are positioned to guide said film between said angulated core on said spool and one of said sprockets, with the ribs being so placed as to direct the film from the roll of film onto said sprocket in aligned guided relation,
   (h) a guide positioned intermediate said sprockets to guide the film in aligned relation from one sprocket onto the other of said sprockets in said housing, (i) said guide having an aperture formed therein, between said sprockets, which aperture is substantially complementary in size to the frame on said motion picture film which is being projected, (j) the other of said sprockets adapted to direct film from said guide onto the outer periphery of said roll of film upon rotation of at least one of said sprockets, (k) said housing having a tubular casing formed transversely therethrough and being in register with said lamp receiving openings in said longitudinally separable portions of said housing to form a substantially closed air conduit therethrough to receive and surround a projection lamp therein, and (1) said tubular casing having an aperture formed therein which is in aligned relation with the aperture in said guide positioned intermediate said sprockets.

2. A cartridge for continuous showing of motion picture film, as defined in claim 1; wherein:

(a) said housing has a transverse slot formed therein intermediate the aperture in said tubular casing through said housing and the aperture formed in said guide which is positioned intermediate said sprockets, and (b) said slot adapted to receive a rotatable shutter therethrough for rotation in synchronized relation with the movement of the film to allow frames of the film to be moved into and out of projection position without visible interruption.

3. A cartridge for continuous showing of motion picture film, as defined in claim 1; wherein (a) said upstanding ribs extend in side by side relation from substantially the periphery of the roll of film to one of said sprockets, (1) said upstanding ribs being parallel for a substantial portion of the length thereof and being in relatively close fitting relation with the thickness of the film, and (b) a rib on said housing extending transversely of said upstanding ribs near the ends thereof adjacent the outer periphery of said roll of film and being of a height to support the edge of the film outwardly from a side of said roll of film.

4. A cartridge for continuous showing of motion picture film, as defined in claim 1; wherein (a) said upstanding ribs have transverse slots formed therein intermediate the lengths thereof, (b) a projection formed on a portion of said housing and being adapted to complementally interfit within said transverse slots in said upstanding ribs, formed on the other portion of said housing, to engage said film to move said film laterally so that the apertures in said film will be in aligned, driving relation with the teeth of said sprocket.

5. In a motion picture projection machine for receiving a cartridge for continuous showing of film;

(a) a housing, (1) a recess formed within said housing to complementally receive a film cartridge therein, (b) a projection lamp mounted within said motion picture projection machine and extending into said cartridge receiving recess, (c) a film cartridge adapted to be received into said cartridge receiving recess, (1) a tubular casing positioned transversely through said cartridge and forming a tubular opening therethrough, (2) said tubular casing having an aperture formed in a side thereof, (3) said tubular casing adapted to surround said projection lamp, (4) said projection lamp adapted to project light through the aperture in said tubular casing, (d) a projection lens system, (1) an apertured film guide within said cartridge, while film guide has the aperture thereof positioned intermediate the aperture within said tubular casing and said projection lens system, (2) a film adapted to pass off of said film cartridge, and to pass between the aperture in said film guide and said projection lens system, (3) said aperture in said tubular casing and said aperture in said film guide being in aligned relation with said projection lens system, with the aperture in said film guide being substantially complementary in size to the frame of the motion picture film being projected, (4) said film cartridge having a transverse slot formed therein intermediate the aperture in said tubular casing and said aperture in said film guide, (5) a spool rotataby mounted in said film cartridge, (6) an endless film adapted to pass off of said film cartridge and over said film guide having an aperture formed therein, and (7) a rotatable shutter extending through said transverse slot in said film cartridge and adapted to rotate between the aperture in said tubular casing and the aperture in said film guide in synchronous relation as the frames of the film move to allow the frames of the film to be moved into and out of projection position without visible interruption while winding the film off of one portion of the spool and onto another portion of the spool in continuous operation.

6. A motion picture projection machine for receiving a cartridge for continuous showing of film, as defined in claim 5; wherein (a) said motion picture projection machine has a film cartridge cover hingeably connected thereto, to cover said recess when in one position, and (b) an air exhaust conduit mounted on said cover and being adapted to register in fluid communication with said tubular casing positioned transversely through said film cartridge so as to discharge air outward therefrom to pass between said projection lamp and the inner wall of said tubular casing.

References Cited

UNITED STATES PATENTS

| | | |
|---|---|---|
| 2,183,117 | 12/1939 | Daniel. |
| 3,176,310 | 3/1965 | Finnerty. |
| 3,208,686 | 9/1965 | Edwards et al. |
| 3,284,155 | 11/1966 | Jensen et al. |
| 3,305,296 | 2/1967 | Nicosia _____ 352—129 |

JULIA E. COINER, Primary Examiner

U.S. Cl. X.R.

352—126